July 4, 1933. C. K. GREENLEAF 1,916,663
CASTER
Filed Aug. 17, 1931

INVENTOR.
Carl K. Greenleaf
BY J. E. Trabucco
ATTORNEY

Patented July 4, 1933

1,916,663

UNITED STATES PATENT OFFICE

CARL K. GREENLEAF, OF PALO ALTO, CALIFORNIA

CASTER

Application filed August 17, 1931. Serial No. 557,528.

This invention relates to new and useful improvements in casters.

An object of my invention is to provide an improved caster for use on furniture and machines of various kinds, embodying self-cleaning means adapted to maintain the caster free from dirt, threads, hair or other foreign substances which ordinarily interfere with the free operation thereof.

Another object of my invention is to provide a novel and improved caster embodying a construction adapted to automatically clean the side and track surfaces of the caster wheel, whereby harmful foreign matter is prevented from interfering with the free rotation of the said wheel.

A further object of my invention is to provide an improved self-cleaning caster, particularly adapted for use on hair waving and drying machines, which embodies a close fitting box-like mounting for the caster wheel and a plurality of oppositely disposed resilient scrapers engaging with the track surfaces thereof, which prevent hair, thread, lint or other foreign matter from accumulating about the axis of the wheel.

Other objects, more or less apparent, will present themselves or will be specifically pointed out in the description to follow.

Figure 1:
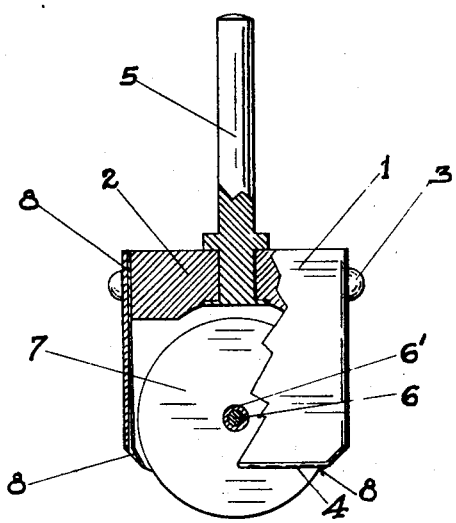
Figure 2:
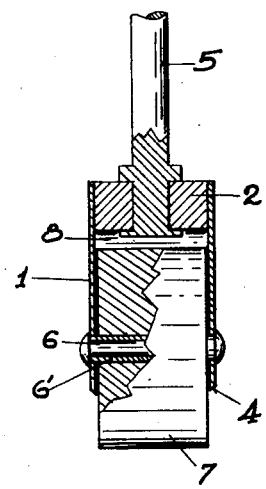

In the accompanying drawing:

Fig. 1 is a side elevation of a caster constructed in accordance with my invention, showing parts thereof in section; and Fig. 2 is a side elevation of the caster as viewed from another side, showing parts thereof in section.

Referring to the drawing, the numeral 1 represents a rectangular shaped casing having a detachable enclosing top member 2 secured thereto at its two oppositely disposed smaller sides, as by screws 3. The lower edges of the two oppositely disposed larger sides of the rectangular casing are beveled as at 4. Suitably secured to the top member 2 is a shank 5 which is adapted to be operatively mounted in the leg of an article of furniture or machine. In order to permit the caster to rotate about a vertical axis independently of the leg of the device on which it is mounted, a suitable ball bearing construction of the ordinary kind may be provided around the shank. Mounted in a bushing 6', with its ends extending through suitable openings provided in the oppositely disposed larger sides of the casing 1, is an axle or pin 6 on which is journaled a rotatable caster wheel 7. The pin is mounted at points beneath the centers of the larger sides of the casing and above the beveled edges 4 thereof, thereby enabling a considerable part of the wheel 7 to project beneath the lower edges of the said casing.

Extending downwardly adjacent each of the smaller side walls of the casing 1, is a resilient steel scraper 8, the upper end of which is held by the screws 3 in a secure position between the top member 2 and the said side wall, and the lower end of which projects beneath the lower edge of the said side wall. The lower end of each of the scrapers 8 is bent inwardly to resiliently contact with opposite sides of the periphery of the caster wheel 7. The extreme lower end of each of the scrapers is provided with a sharp cutting edge which causes any accumulations such as gum, to be removed from the periphery of the caster wheel as the latter is rotated in either direction about its axis.

The larger sides of the casing 1 are in fairly close contact with the sides of the caster wheel, thereby enabling the beveled lower edges of the said sides to cause the removal of any accumulations of dirt, etc., from the sides of the said wheel as the latter rotates about its axis.

Owing to the fact that the resilient scrapers 8 and the beveled lower edges of the larger side walls of the casing 1 enable the exposed surfaces of the wheel 7 to be automatically cleaned as the machine on which the casters are mounted is moved about, strands of hair or thread as well as lint and dirt are prevented from collecting around the axis of the caster wheel. By maintaining the axis free from undesirable accumulations, the caster wheel is allowed to freely rotate without danger of jamming or otherwise becoming ineffectual as a rotatable member.

It is to be understood that my improved caster is capable of being embodied in other forms or constructions equally as efficient as the one herein shown and described, so for this and other apparent reasons I desire my invention included broadly within the spirit of the appended claims.

Having described my invention, what I claim is:

1. A caster comprising a four-sided casing, two opposite side walls of the said casing being larger in area than the other two opposite side walls, a detachable top member enclosing the top end of the casing, a wheel mounted in the casing on an axis, the ends of the said axis being mounted in the larger side walls of the casing, a part of the periphery of said wheel extending beneath and through the lower end of the casing, a pair of scrapers secured to the smaller opposite side walls of the casing, one end of each scraper extending beneath the lower edge of the casing and in contact with the periphery of the wheel, and means secured to the top member for attaching the caster to a device.

2. A caster comprising a four-sided casing having two of its opposite side walls of larger area than its other two opposite side walls, the lower edges of two larger side walls being beveled, a wheel rotatably mounted in the cylinder with a part of its periphery projecting beneath the lower end of the cylinder, the two opposite sides of the wheel being in close proximity to the two larger side walls of the cylinder, a pair of oppositely disposed scrapers secured at their upper ends to the two smaller side walls of the cylinder, the lower free ends of the scrapers being bent inwardly and in contact with the periphery of the wheel, and means attached to the cylinder for mounting the same on a device.

In testimony whereof I have affixed my signature.

CARL K. GREENLEAF.